(No Model.)

E. WIESNER.
FLOWER POT MACHINE.

No. 352,173. Patented Nov. 9, 1886.

Witnesses:
E. E. Smith
D. H. Boyden.

Inventor:
Eberhard Wiesner
Boyden, Barlie & Mason
Attys.

UNITED STATES PATENT OFFICE.

EBERHARD WIESNER, OF BALTIMORE, MARYLAND.

FLOWER-POT MACHINE.

SPECIFICATION forming part of Letters Patent No. 352,173, dated November 9, 1886.

Application filed August 7, 1886. Serial No. 210,361. (No model.)

*To all whom it may concern:*

Be it known that I, EBERHARD WIESNER, a citizen of the United States, residing at Baltimore, State of Maryland, have invented certain new and useful Improvements in Flower-Pot Machines; and I do hereby declare the following to be a full, clear, and exact description of the invention, such as will enable others skilled in the art to which it appertains to make and use the same.

My invention relates to improvements in machinery for molding flower-pots, wherein I employ a rotary crank or crank-wheel to produce the necessary reciprocating motion to the molds, and whereby power to drive the said machinery may be transmitted through gearing or belts by steam or otherwise, and wherein is provided devices for adjusting the molds to compensate for any wear in the machinery, and whereby a uniformity is preserved in the performance of the machine. I accomplish these objects by the devices illustrated in the accompanying drawings, in which—

Figures 1, 2:
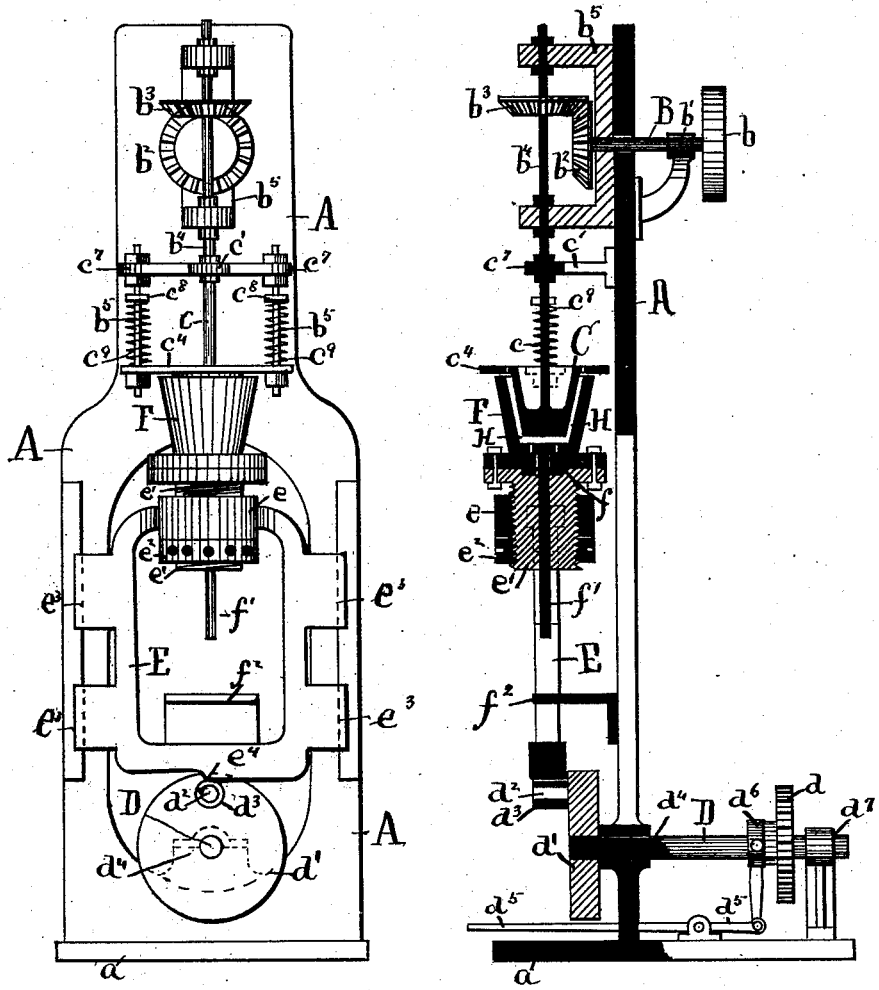
Figure 3:
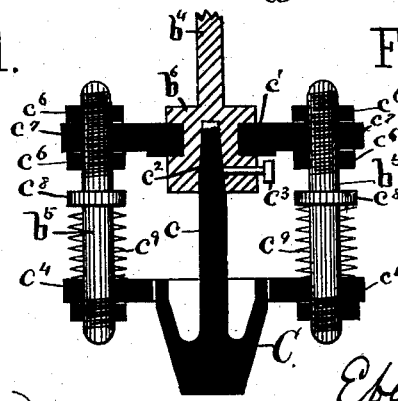

Figure 1 is a front elevation in full of the machine. Fig. 2 is a vertical section through $x$, Fig. 1. Fig. 3 is an enlarged sectional view of the adjusting device for the cope of the mold.

Similar letters refer to similar parts throughout the several views.

The letter A designates the frame of the machine, which also forms the base-plate $a$ for the necessary foundation. The shaft B is supported by the bearing $b'$, and is driven by the pulley $b$ either directly from the main shaft D or from a counter-shaft, and imparts a horizontal rotary movement to the spindle $b^4$ by means of the bevel-gear wheels $b^2$ and $b^3$. To the frame A is fixed the bracket $b^5$, which forms bearings for the spindle $b^4$. The end of the said spindle $b^4$ terminates in the enlarged end $b^6$, at which point it is provided with the bearing $c'$. Integral with the inner mold, C, is the spindle $c$, its end $c^2$, Fig. 3, being made tapering to fit a corresponding tapered opening in the enlarged end $b^6$ of the spindle $b^4$, and is held therein by the set-screw $c^3$.

Surrounding the inner mold, C, and permitting the said mold to revolve freely within it, is the cope-plate $c^4$, against which the top of the outer mold, F, strikes, forming a cope to the mold. The plate $c^4$ is made adjustable by means of the bolts $b^5$ and lock-nuts $c^6$, the said bolts being fixed rigidly to the plate $c^4$ and adjusted by the lock-nuts $c^6$, which are locked to the projecting arms $c^7$ of the bearing $c'$, the projecting arms $c^7$ being integral with the bearing $c'$. The bolts $c^5$ are provided with the collars $c^8$, which serve as a bearing for one end of the springs $c^9$, the other end of the said spring bearing upon the plate $c^4$, thus, by lengthening or shortening the bolts $c^5$, putting any desired pressure upon the plate $c^4$ and regulating the pressure in the mold.

The letter D denotes the main shaft, which has a bearing, $d^4$, in the frame A, and an outer bearing, $d^7$, and is driven either by the geared wheel $d$ and a pinion, or it may be driven direct from a fly-wheel and belt. The said shaft D is provided with a clutch-coupling, $d^6$, either frictional or positive, which is operated by foot through the lever $d^5$, thus permitting the crank-wheel $d'$ and its section of shaft to be instantly thrown in or out of gear.

The crank-wheel $d'$ is provided with the crank-pin $d^2$ and roller $d^3$ thereon, which operates the yoke E. The bottom of the said yoke E, resting upon the roller $d^3$, is lifted on the upward stroke of the crank-pin $d^2$, and by gravitation following it on the downward stroke, thus producing a reciprocating motion in the yoke E.

In the upper end of the yoke E is the boss $e$, which is threaded to suit the plug $e'$, the said plug $e'$ being provided with a flange, to which is secured with a corresponding flange the outer mold, F, thus permitting the mold F to be screwed in or out of the yoke E, and preserving the proper molding-space, H, between the inner mold, C, and the outer mold, F, and secured in this position by the lock-nut $e^2$.

The yoke E is provided with the guides $e^3$, and its bottom surface, against which the roller $d^3$ operates, is made with the curved offset $e^4$, as represented in Fig. 1. The roller $d^3$, coming in contact with this offset just before the completion of the upward stroke, serves to produce a sudden and quick upward movement to the outer mold, F, which at this stage of the operation produces a good result.

It is obvious that a reciprocating motion can be imparted to the yoke E by means of the crank-wheel $d'$ and a connecting-rod. I prefer, however, to have the roller $d^3$ act directly upon the yoke E, as by this arrangement I get the benefit of the accelerated motion produced by the offset $e^4$.

Working freely within the mold F is the ejector $f$, with its spindle $f'$ extended through the plug $e'$, which on the downward stroke of the yoke E is brought in contact with the plate $f^2$, thereby raising the ejector within the mold F and removing the molded flower-pot from the mold.

The manner of operating is as follows: The crank-wheel $d'$ is kept out of gear by means of a weight or spring attached to the lever $d^5$. In this position gravity holds the yoke E and the crank-pin $d^2$ on the bottom center, and the outer mold, F, is in its lowest position away from the inner mold, C. The necessary amount of clay to form a pot is now thrown in the outer mold, F, and the lever $d^5$ is pressed down by the foot, thereby throwing in gear, by means of the clutch-coupling $d^6$, the crank-wheel $d'$, which in its revolution raises the yoke E and the outer mold, F, to the position represented in Fig. 2, wherein the space H between the inner mold, C, and the outer mold, F, forms the mold for the flower-pot. Just before the completion of the upward stroke the top of the mold F comes in contact with the plate $c^4$, which, being provided with the springs $c^3$, will give to the movement of the outer mold, F, but maintain sufficient pressure upon the superfluous clay which will be forced therebetween to insure homogeneity in the flower-pot. On the downward stroke of the yoke E the spindle $f'$ of the ejector $f$ will come in contact with the plate $f^2$, and the ejector $f$ will be raised within the mold F, carrying with it the molded flower-pot for removal. The pressure upon the lever $d^5$ is maintained only sufficiently long for the crank-wheel to make one revolution, when the completed work is removed, new material substituted, and the operation repeated.

The inner mold, C, is kept continually revolving, which prevents the clay from sticking to this mold, and likewise forms a smooth surface on the inside of the flower-pot.

I am aware that flower-pot machines have been constructed to be operated from a rotary motion, and have been provided with a yielding cope-plate. What I claim as new in my invention is the offset $e^4$ on the yoke E, to impart a beneficial accelerative motion to the mold F near the end of the stroke, and the devices specified for adjusting the reciprocating mold F, and the cope-plate $c^4$, to provide a proper adjustment for any lost motion which may occur in the machinery.

What I claim, and desire to secure by United States Letters Patent, is—

1. In a flower-pot machine, the combination of the revolving mold C, the reciprocating mold F, the crank-wheel $d'$, and the yoke E, provided with the offset $e^4$, for the purpose set forth.

2. In a flower-pot machine, the combination of the revolving mold C, the reciprocating mold F, and the adjustable cope-plate $c^4$, consisting of the fixed arms $c^7$, the plate $c^4$, the bolts $b^5$, provided with the collars $c^5$, the springs $c^3$, and the lock-nut $c^6$, for the purpose set forth.

3. In a flower-pot machine, the combination of the crank or crank-wheel $d'$, the inner mold, C, the yoke E, and the adjustable reciprocating mold F, provided with the threaded plug $e'$, and the lock-nut $e^2$, arranged to screw in and out of the said yoke E for adjustment, for the purpose set forth.

In testimony whereof I affix my signature in presence of two witnesses.

EBERHARD WIESNER.

Witnesses:
 JNO. T. MADDOX,
 G. A. BOYDEN.